United States Patent [19]

Tomuro et al.

[11] 4,447,853

[45] May 8, 1984

[54] CERAMIC CAPACITOR

[75] Inventors: Noboru Tomuro; Isao Ishiguchi; Shinjiro Tsujikawa; Masao Kashima, all of Yokoze; Yasuo Miyashita, Chichibu, all of Japan

[73] Assignee: Mitsubishi Mining & Cement Company, Ltd., Chiyoda, Japan

[21] Appl. No.: 519,172

[22] Filed: Aug. 1, 1983

[30] Foreign Application Priority Data

Aug. 25, 1982 [JP] Japan .................................. 57-146233

[51] Int. Cl.$^3$ .............................................. H01G 4/12
[52] U.S. Cl. .................................................. 361/321
[58] Field of Search ................................ 361/321, 320

[56] References Cited

U.S. PATENT DOCUMENTS 4,312,023 1/1982 Frappart et al. ................ 361/321 X

FOREIGN PATENT DOCUMENTS 53-89962 8/1978 Japan .................................. 361/321

Primary Examiner—Donald A. Griffin
Attorney, Agent, or Firm—Wegner & Bretschneider

[57] ABSTRACT

There is disclosed a ceramic capacitor comprising a polycrystalline ceramic dielectric material disposed between electrodes of conductive material with the polycrystalline ceramic dielectric material having a thickness not more than 30 $\mu$m and a particle size not more than one fifth of the thickness of the dielectric material.

3 Claims, No Drawings

CERAMIC CAPACITOR

BACKGROUND OF THE INVENTION

1. Field of the Invention

The present invention relates to a compact size, high capacitance and high reliability polycrystalline ceramic capacitor.

2. Description of the Prior Art

It has been recently attempted to reduce the thickness of a ceramic dielectric material of a multilayer ceramic capacitor to less than 30 μm and more preferably to less than 20 μm to improve the capacitance per unit volume, reduce the number of electrodes and reduce the size of the capacitor. However, when the thickness of the dielectric material is reduced, the breakdown voltage is lowered accordingly and the lifetime is shortened. Therefore, a highly reliable capacitor could not be attained. In this regard, the particle size of the dielectric material is analyzed below.

In the prior art ceramic capacitor, a material produced by a solid state reaction such as barium titanate which is produced by wet-mixing barium carbonate and titamium oxide, dehydrating and drying the mixture at 1000° C.-1200° C., sintering it and wet-grinding it, is used as the dielectric material. Such a material has a large particle size such as 1-3 μm and the particle size distributes in a wide range. The particle size of the dielectric material of the ceramic capacitor produced by forming the above material under pressure and sintering is much larger than 3 μm and amounts to 6 μm or more and a variation of the particle size is large because of local grain growth of crystal in the sintering process due to impurities and ununiform particle size. When a voltage is applied to such a ceramic capacitor manufactured by the material having the ununiform particle size, an electric field is concentrated on large size particles and the breakdown voltage is lowered, and a distribution curve extends to a low voltage region. Thus, the lifetime is shortened, a probability of break is large and the reliability is low. Accordingly, if such ceramic dielectric material is used in a capacitor with a reduced thickness, the breakdown voltage is further lowered, the lifetime is significantly shortened and many problems will arise.

SUMMARY OF THE INVENTION

In this connection, the inventors of the present invention studied the effect of the relation between the particle size of the ceramic dielectric material and the thickness of the dielectric material on the performance of the ceramic capacitor and successed to develop a novel ceramic capacitor which is free from the above disadvantages.

DESCRIPTION OF THE PREFERRED EMBODIMENTS

The ceramic capacitor of the present invention is now explained in detail. The present ceramic capacitor comprises polycrystalline ceramic dielectric material and a plurality of electrodes of conductive material, wherein the thickness of the ceramic dielectric material disposed between at least one pair of opposing electrodes is no more than 30 μm and the particle size of the ceramic dielectric material is no more than one fifth of the thickness of the dielectric material.

The thickness of the ceramic dielectric material is selected to be no more than 30 μm because the realization of such a ceramic capacitor is a current problem to be resolved. The maximum particle size is selected as described above because, in the ceramic capacitor having the thin ceramic dielectric material of no more than 30 μm in thickness, it is necessary that the maximum particle size of the ceramic dielectric material is no more than one fifth of the thickness of the dielectric material in order to attain practically sufficient breakdown voltage and lifetime, as is seen from the discussion on the various measurements in the embodiments to be described later.

The ceramic dielectric material of the ceramic capacitor of the present invention is made of strictly selected fine and uniform material having as narrow grain distribution as possible and it is produced by a highly controlled sintering process.

Such a material may be produced by synthesizing stoichiometrically uniform barium titanate while forming and co-precipitating additives in solution reaction, for example, thermal decomposition of barium titanyl oxalate, synthesizing method of barium nitrate and titanium tetrachloride, or hydrolysis of titanium and barium alkoxyd. Material having the particle size of no more than 0.1 μm and very narrow grain distribution and containing few amount of alkali metal oxide such as sodium or potassium, alkali earth metal oxide excluding barium such as calcium or strontium, silicon oxide, aluminum oxide and sulfuric acid compound is used.

For ceramic capacitors having 20 layers of the ceramic dielectric material having the thickness of 30 μm after firing (Example 1), 20 μm (Example 2) and 10 μm (Example 3), the particle sizes were selected to be no more than one fifth of the thicknesses of the respective dielectric materials and the breakdown voltages and the lifetimes under high temperature load were measured. They are shown in Tables 1, 2 and 3.

In the Tables, sample numbers 1-5, 8-10 and 13 and 14 are capacitors of the present invention, and the sample numbers 6, 7, 11, 12 and 15 are comparative examples which are out of the scope of the present invention.

The firing conditions (temperature and time) are shown in Tables. The manufacturing method of the material is explained hereinlater. The manufacturing method of the multilayer capacitor is same as the prior art method.

TABLE 1

Thickness of dielectric material in one layer: 30 μm
Number of layers: 20

| Sample No. | Material | Firing condition Temperature (°C.) | Time (hr) | Maximum particle size (μm) | Breakdown voltage Max. (V) | Min. (V) | Average (V) | Standard deviation (V) | Average Dielectric material thickness (KV/mm) | Life test under high temperature load Number of defects in 5000 hours | Fit |
|---|---|---|---|---|---|---|---|---|---|---|---|
| 1 | A | 1300 | 1.5 | 2.0 | 1600 | 1000 | 1212 | 124 | 40.4 | 1 | 0.4 |
| 2 | A | 1300 | 2.0 | 3.2 | 1600 | 900 | 1191 | 132 | 39.7 | 1 | 0.4 |
| 3 | A | 1300 | 4.0 | 4.2 | 1550 | 750 | 1137 | 150 | 37.9 | 2 | 0.6 |
| 4 | B | 1330 | 2.0 | 5.1 | 1500 | 650 | 1056 | 167 | 35.2 | 4 | 1.0 |
| 5 | C | 1350 | 2.0 | 6.0 | 1450 | 550 | 954 | 173 | 31.8 | 5 | 1.2 |
| 6 | D | 1370 | 1.0 | 6.5 | 1400 | 450 | 855 | 178 | 28.5 | 8 | 1.8 |
| 7 | D | 1370 | 2.0 | 7.7 | 1300 | 350 | 753 | 183 | 25.1 | 9 | 2.0 |

TABLE 2

Thickness of dielectric material in one layer: 20 μm
Number of layers: 20

| Sample No. | Material | Firing condition Temperature (°C.) | Time (hr) | Maximum particle size (μm) | Breakdown voltage Max. (V) | Min. (V) | Average (V) | Standard deviation (V) | Average Dielectric material thickness (KV/mm) | Life test under high temperature load Number of defects in 5000 hours | Fit |
|---|---|---|---|---|---|---|---|---|---|---|---|
| 8 | A | 1300 | 1.5 | 2.0 | 1100 | 700 | 864 | 83 | 43.2 | 3 | 0.8 |
| 9 | A | 1300 | 2.0 | 3.0 | 1100 | 650 | 788 | 106 | 39.4 | 4 | 1.0 |
| 10 | A | 1300 | 3.0 | 4.0 | 1000 | 400 | 640 | 115 | 32.0 | 5 | 1.2 |
| 11 | A | 1300 | 4.0 | 4.5 | 950 | 350 | 608 | 121 | 30.4 | 8 | 1.8 |
| 12 | B | 1300 | 1.0 | 5.0 | 900 | 250 | 542 | 127 | 27.1 | 17 | 3.2 |

TABLE 3

Thickness of dielectric material in one layer: 10 μm
Number of layers: 20

| Sample No. | Material | Firing condition Temperature (°C.) | Time (hr) | Maximum particle size (μm) | Breakdown voltage Max. (V) | Min. (V) | Average (V) | Standard deviation (V) | Average Dielectric material thickness (KV/mm) | Life test under high temperature load Number of defects in 5000 hours | Fit |
|---|---|---|---|---|---|---|---|---|---|---|---|
| 13 | A | 1300 | 1.0 | 1.6 | 650 | 350 | 463 | 57 | 46.3 | 5 | 1.2 |
| 14 | A | 1300 | 1.5 | 2.0 | 650 | 250 | 401 | 77 | 40.1 | 8 | 1.8 |
| 15 | A | 1300 | 2.0 | 2.8 | 550 | 100 | 298 | 103 | 29.8 | 19 | 3.6 |

In the above Tables, the maximum particle size was measured by a metal microscope of 1000 magnification after the fired material was polished to allow the observation of a sectional plane and thermally etched to define the particle size.

The breakdown voltage was measured by Nisshin Denki Model NS-3150 for 100 samples.

The lifetime under high temperature load was measured under the application of 100 V D.C. at 150° C. for 20 samples.

The defect rate (Fit) was calculated by setting a reference condition of 12.5 V and 40° C. and the number of defects in 5000 hours was processed by 60% reliability standard and 95% estimated value in accordance with voltage cubic rule and temperature 10° C. rule (k=2).

The materials A–D in the Tables were prepared in the following manner.

Material A

Barium isopropoxyd and titanium isopropoxyd were weighed at a ratio of 1 to 1 by mol percent and they were mixed in benzene and reacted at 70° C. Then water was added to the mixture to hydrolyze it to produce white barium titanate precipitate. Cerium isopropoxyd was added to benzene and water was added thereto at 70° C. to hydrolyze it to produce yellow cerium oxide precipitate. Titanium isopropoxyd was added to benzene and water was added thereto at 70° C. to hydrolyze it to produce white titanium oxide precipitate. 92 mol % of barium titanate, 4 mol % of cerium oxide and 4 mol % of titanium oxide were weighed and they were wet-mixed in a ball mill for 20 hours. Then the mixture was dehydrated and dried. The resulting material is the material A.

Material C

Barium titanyl oxalate of reagent special grade in the amount of 92 mol % by barium titanate content, cerium oxalate in the amount of 4 mol % by cerium oxide content and titanium oxalate in the amount of 4 mol % by titanium oxide content were weighed and wet-mixed in a ball mill for 20 hours. The mixture was ground, dehydrated and dried and left at 700° C. for one hour to thermal-decompose it. Resulting material C had the particle size of no more than 0.1 μm.

Material B

The material C was dry-ground to produce finer material B.

Material D

The material D was prepared by a conventional solid state reaction.

While the multilayer capacitors are shown in the above Examples, the present invention is not limited thereto and a single-layer capacitor or a capacitor structure having two or more capacitors in one element material may be constructed.

The ceramic capacitor of the present invention provides the following advantages.

The present capacitor has the very thin thickness of the ceramic dielectric material, that is, no more than 30 $\mu$m, yet the breakdown voltage is sufficiently high and the variation thereof is small as seen from the above Tables. As a result, the possibility of defect is small and the reliability is high.

Accordingly, the ceramic capacitor which is more compact, has a higher capacitance and is more reliable than the prior art capacitor is provided.

When two or more capacitors are formed in one elementary material, the manufacture is simplified to compare with a cost where a plurality of capacitors are separately manufactured.

We claim:

1. A ceramic capacitor comprising a polycrystalline ceramic dielectric material and a plurality of electrodes of conductive material, characterized in that said ceramic dielectric material is disposed between at least one pair of opposing electrodes and has a thickness not more than 30 $\mu$m and a particle size not more than one fifth of the thickness of said dielectric material.

2. A ceramic capacitor according to claim 1, wherein a plurality of ceramic dielectric materials and the plurality of electrodes are alternately laminated.

3. A ceramic capacitor according to claim 1, wherein same or different types of ceramic dielectric materials are disposed between at least one pair of electrodes to form at least two capacitors.

* * * * *